United States Patent [19]

Balsley

[11] 4,069,796

[45] Jan. 24, 1978

[54] ENGINE MANIFOLD WITH AIR GAP INSULATOR CARBURETOR MOUNTING

[75] Inventor: Richard L. Balsley, Washington, Mich.

[73] Assignee: General Motors Corporation, Detroit, Mich.

[21] Appl. No.: 726,605

[22] Filed: Sept. 27, 1976

[51] Int. Cl.² .............................................. F22B 9/06
[52] U.S. Cl. ............................ 123/75 B; 123/119 A; 123/122 AB; 123/141
[58] Field of Search .......... 123/52 M, 52 MU, 119 A, 123/119 B, 122 AB, 122AC, 141; 261/145; 48/180 A

[56] References Cited

U.S. PATENT DOCUMENTS

| | | | |
|---|---|---|---|
| 3,362,386 | 1/1968 | McMahon | 123/119 B |
| 3,596,887 | 8/1971 | Castine | 261/145 |
| 3,717,131 | 2/1973 | Chana et al. | 123/119 A |
| 3,941,105 | 3/1976 | Yagi et al. | 123/75 B |
| 3,994,270 | 11/1976 | Nakano et al. | 123/122 AC |

*Primary Examiner*—Charles J. Myhre
*Assistant Examiner*—Craig R. Feinberg
*Attorney, Agent, or Firm*—Arthur N. Krein

[57] ABSTRACT

The intake manifold of an internal combustion engine has incorporated therein a bottom mixture plenum in heat transfer relationship for heating thereof by exhaust gases discharged from the engine. The plenum receives the induction mixture for the engine through at least one inlet bore in the form of a tube perforated through its side wall to distribute air and crankcase ventilation fumes from an air chamber located directly under the carburetor pad of the intake manifold and to distribute recirculated exhaust gases from a second chamber positioned between the plenum and the air chamber, the second chamber being supplied with exhaust gases for recirculation, the air chamber providing, in effect, an air gap insulator to reduce the transfer of heat from the exhaust gases to a carburetor mounted on the conventional carburetor pad of the intake manifold.

6 Claims, 5 Drawing Figures

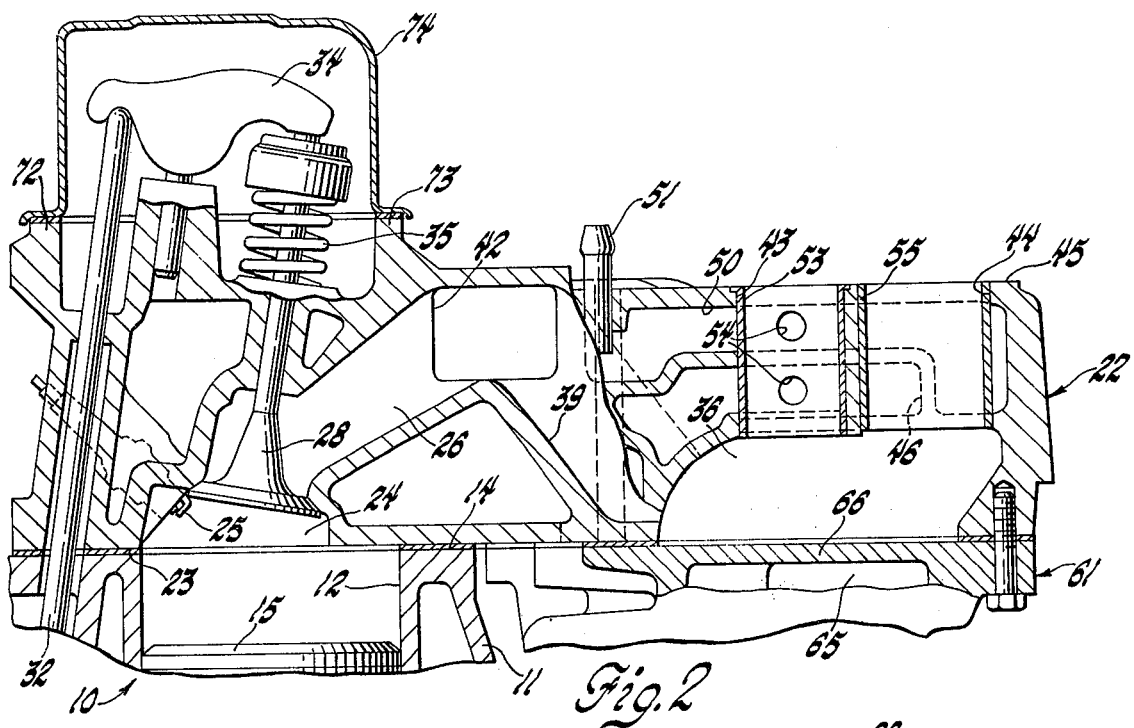
Fig. 2
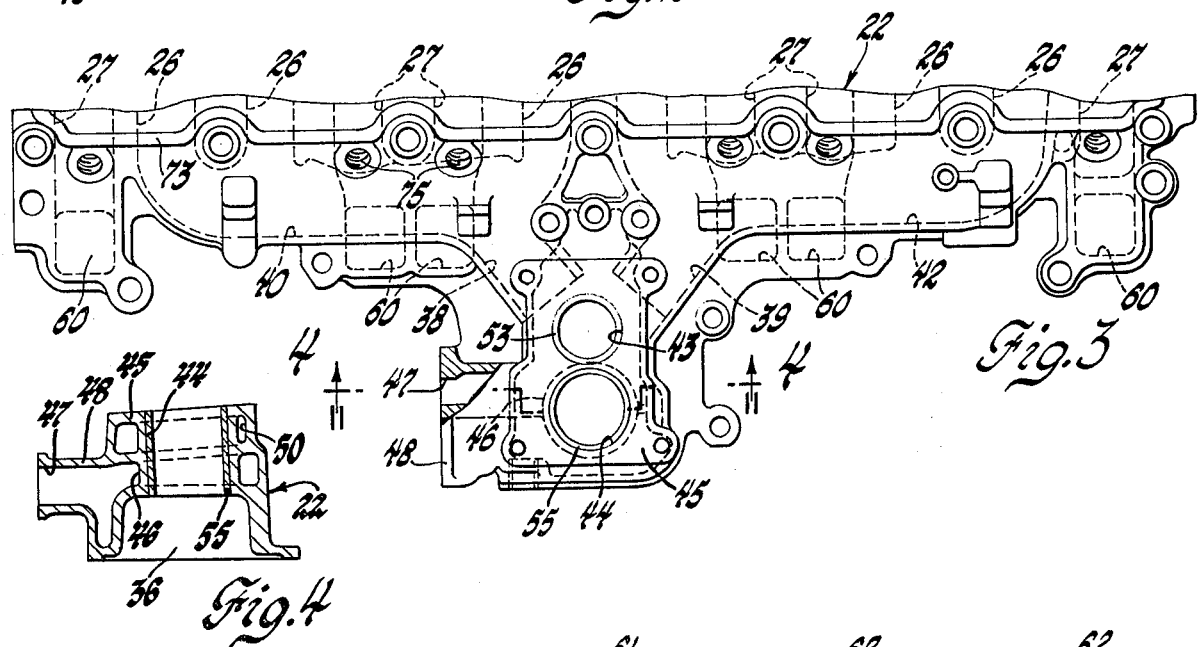
Fig. 3
Fig. 4
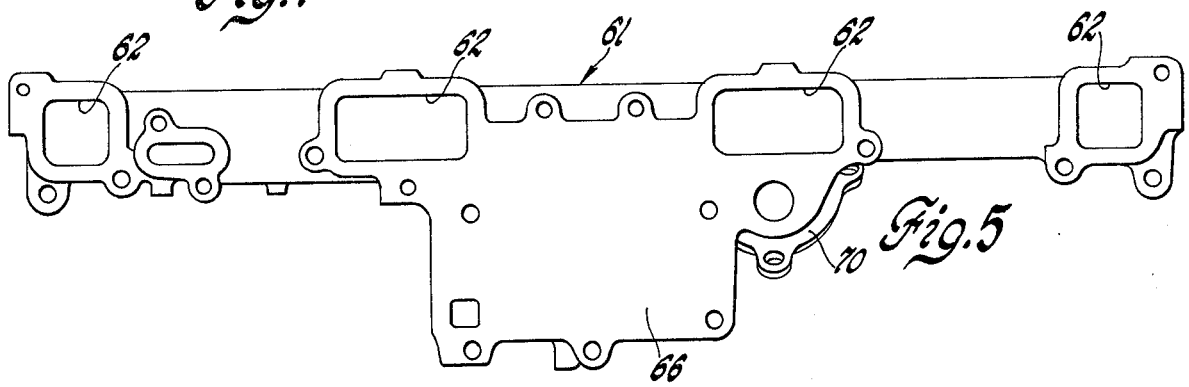
Fig. 5

ENGINE MANIFOLD WITH AIR GAP INSULATOR CARBURETOR MOUNTING

This invention relates to an intake manifold for an internal combustion engine and, in particular, to an engine intake manifold with an air gap insulator for the carburetor mounting pad incorporated therein.

BACKGROUND OF THE INVENTION

It is known in the construction of internal combustion engines to provide an intake manifold having an induction inlet for a fuel-air mixture which discharges into a mixture plenum that is suitably formed in the head portion thereof and which is located to be heated by the exhaust gases discharged from the engine. In addition, it is known to provide means, as by a chamber surrounding the inlet with suitable openings therefrom into the induction inlet, for supplying recirculated exhaust gases to the induction mixture. Such an arrangement is shown, for example, in U.S. Pat. No. 3,949,715 entitled "Manifold Construction for an Internal Combustion Engine" issued Apr. 13, 1976 to Louis J. Faix, Robert T. Price and James R. Spaulding. Specifically, in this patent, there is disclosed an intake manifold structure formed integral with a cylinder head for use, for example, with an in-line engine and wherein an open bottomed mixture plenum is provided in this structure that is closed by the heated wall of an exhaust manifold whereby to supply mixture heat to the plenum, the plenum receiving an air-fuel mixture through an inlet tube perforated to distribute recirculated exhaust gases from an annular chamber in the structure located between the plenum and the mounting pad thereof used to support a carburetor for the engine.

It is now realized that in intake manifolds, such as of the type disclosed in the above identified U.S. Pat. No. 3,949,715, wherein a heated mixture plenum and a means to effect exhaust gas recirculation are incorporated therein and positioned closely adjacent to the mounting pad for the carburetor, excessive heat can be readily transferred to the carburetor which, as well known, could adversely affect operation of the carburetor.

It is therefore the primary object of this invention to improve an intake manifold for an internal combustion engine whereby the intake manifold structure is provided with an air gap insulator located directly under the mounting pad of the structure whereby to reduce the transfer of heat to the carburetor mounted thereon.

It is another object of this invention to provide an improved intake manifold structure for an internal combustion engine whereby a chamber is provided directly under the carburetor pad of such a structure for admitting air and crankcase ventilation fumes at least to the primary bore extending from the carburetor mounting pad so that the carburetor mounting pad is air cooled.

These and other objects of the invention are obtained in the intake manifold of an internal combustion engine by the provision of an air chamber under the carburetor pad for admitting air and crankcase ventilation fumes to at least the primary bore extending from the carburetor support pad, this air chamber preferably being located above an exhaust gas recirculation supply chamber also surrounding the primary bore and connected thereto to permit exhaust gases to be recirculated into the intake mixture flow through the manifold. The air chamber serves as an air gap insulator to reduce the transfer of heat from the exhaust gases to the carburetor mounted on the carburetor mounting pad of the intake manifold, as well as being operative to improve mixing of the various added gases with the air-fuel mixture entering the intake manifold and to provide for ideal mixture distribution of vacuum supplies.

For a better understanding of the invention, as well as other objects and further features thereof, reference is had to the following detailed description of the invention to be read in connection with the accompanying drawings, wherein:

FIG. 2 is a partial sectional view of the engine of FIG. 1, the section being taken through a manifold intake port for the engine and through the carburetor mounting pad portion of the integral cylinder head - intake manifold;

FIG. 3 is a top view showing only the intake manifold portion of the integral cylinder head - intake manifold of the engine;

FIG. 4 is a sectional view of a portion of the intake manifold portion taken along line 4—4 of FIG. 3; and, FIG. 5 is a top view of the engine exhaust manifold for the engine.

Figure 1:
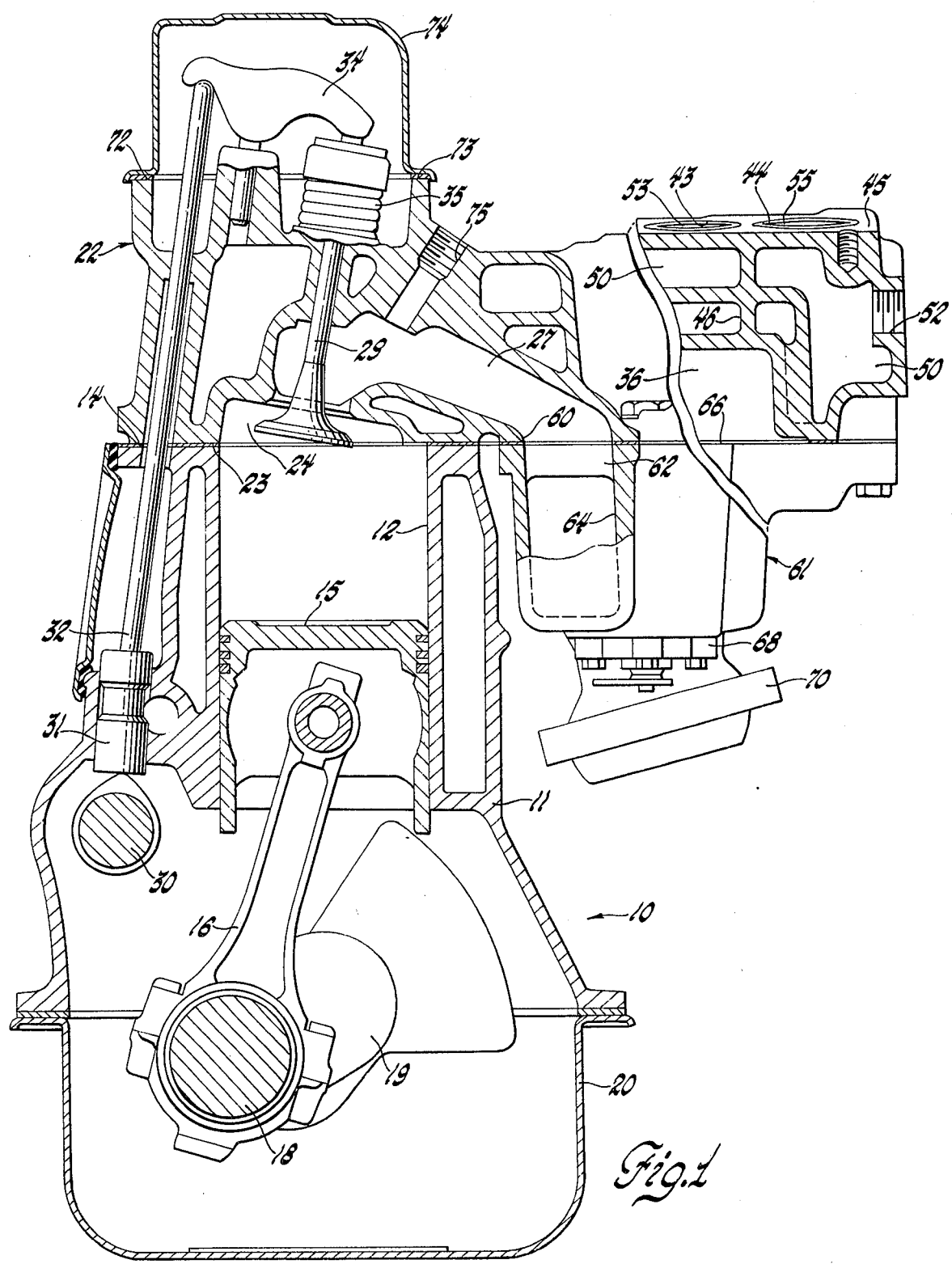
FIG. 1 is a transverse cross sectional view of a six-cylinder in-line internal combustion engine having an integral cylinder head - intake manifold, constructed in accordance with the invention, the section being taken through a manifold exhaust port for the engine.

Although the engine manifold with air gap insulator carburetor mounting of the subject invention could be incorporated into the most common type intake manifolds as used with internal combustion engines, for purposes of illustration only, the invention is shown as used in an integral cylinder head - intake manifold structure, which is somewhat similar in construction to that disclosed in the above identified U.S. Pat. No. 3,949,715 as used on a six-cylinder in-line spark ignition engine of the type used in motor vehicles.

Referring now to the drawings and, in particular, to FIG. 1, numeral 10 generally indicates a six-cylinder in-line spark ignition internal combustion engine having a conventionally arranged cylinder block 11. The cylinder block includes six integrally cast cylinders 12 arranged in-line and having their outer ends opening through an upper end wall 14. The cylinders contain the usual pistons 15 connected by connecting rods 16 with individual crank throws 18 of a crankshaft 19 carried for rotation in the cylinder block in conventional manner. The open bottom of the cylinder block containing the crankshaft is closed by an oil pan 20.

A cylinder head - intake manifold member 22 is formed as an integral casting and is provided with a planar mounting face 23. Mounting face 23 comprises the lower surface of the head 22 by which it is sealingly secured to the upper end wall 14 of the cylinder block 11, closing the upper ends of the cylinders 12. The portions of the cylinder head at the ends of the various cylinders are provided with recesses defining combustion chambers 24. Each combustion chamber 24 is provided with a spark plug 25 and connects with an intake port 26 and an exhaust port 27 formed within the cylinder head - intake manifold and controlled by poppet valves 28, 29, respectively. The valves are actuated in conventional fashion by a camshaft 30 mounted in the cylinder block and acting through valve lifters 31, push rods 32, and rocker arms 34 with coil springs 35 conventionally arranged to bias the valves in closing direction.

The cylinder head - intake manifold 22 is provided, in a portion laterally distant from the combustion chambers 24 and centered along side them, with an enlarged chamber defining a mixture plenum 36, the bottom of which is open through the planar mounting face 23 of the cylinder head - intake manifold. Plenum 36 connects through a pair of outwardly and upwardly angled feeder passages 38, 39 with separate longitudinally aligned front and rear distribution passages 40, 42, respectively. The distribution passages extend longitudinally within the cylinder head - intake manifold between the row of combustion chambers 24 and the mixture plenum 36 and above the level of both. The front distribution passage 40 connects with the laterally upwardly extending intake ports 26 of the front three engine cylinders, while the rear distribution passage 42 connects with the laterally upwardly angled intake ports of the rear three cylinders. Thus, in plan view, as partly shown in FIG. 3, the induction passages have somewhat the appearance of moose antlers with the front and rear groups of the three engine cylinders being separately connected with the mixture plenum 36 through their individual distribution and feeder passages. In cross section, as best seen in FIG. 2, it is apparent that flow from the mixture plenum 36 is first upward through feeder passages 38, 39 to the longitudinal distribution passages 40, 42 and then downward through the intake ports of the individual cylinders.

To provide for the supply of an air-fuel mixture to the mixture plenum 36, the cylinder head - intake manifold member 22, in the construction illustrated, includes a primary mixture opening 43 and a secondary mixture opening 44 connecting the upper portion of the plenum 36 with a carburetor mounting boss or pad 45 provided on an upper surface of the intake manifold portion of the cylinder head - intake manifold member 22. A conventional carburetor 80 is suitably fixed to the carburetor mounting boss or pad 45 and has its primary induction passage 81 and secondary induction passage 82 therethrough aligned with the primary mixture opening 43 and secondary mixture opening 44, respectively. As is conventional, flow through the primary induction passage 81 and secondary induction passage 82 is controlled by throttle valves 83 and 84, respectively. An annular exhaust chamber 46 is provided in the member 22 next adjacent to the upper wall of the plenum 36 to surround the primary mixture opening 43, the exhaust chamber 46 receiving a portion of the engine exhaust gases through an opening 47 in the side flange 48 of member 22 closely adjacent to the mounting pad 45.

Now in accordance with the invention, there is also provided an air chamber 50 in the cylinder head - intake manifold member 22 which is located between the exhaust chamber 46 and the mounting pad or boss 45 and this air chamber surrounds both the primary mixture opening 43 and the secondary mixture opening 44 and, as best seen in FIG. 2, partly encircles the exhaust chamber 46 on the outboard side thereof, so as to serve as an air gap insulator to prevent or at least reduce heat transfer from both the plenum 36 and the exhaust chamber 46 to the mounting pad 45 and to effect air cooling of the pad 45.

Preferably as shown, air is supplied to the air chamber 50 from two sources with this air then discharged from the air chamber for use in the engine in a manner to be described. Thus as shown, a tube 51 mounted through a suitable aperture in the member 22 has one end thereof in communication with the air chamber 50 while its other end is positioned so as to be connected, as by a hose, to, for example, a conventional positive crankcase ventilation system, not shown, for the engine. Thus as is well known, the crankcase ventilation system receives its air through the engine air cleaner snorkel, not shown, with the air flowing through a hose and filter, also not shown, into the engine crankcase where it mixes with crankcase vapors and these vapors are then drawn, through a spring loaded positive crankcase ventilation valve, not shown, and then, for example, through a hose, not shown, connected to the tube 51, into the air chamber 50. In addition, a threaded opening 52 in a side wall of the member 22 is used to connect the air chamber 50 through a suitable vacuum hose connection, not shown, to the various known vacuum actuated or controlled elements of the engine or of the vehicle with which the engine 10 is associated, whereby this air chamber 50 can thus be used as a common source of a vacuum supply for these elements, again in a manner to be described.

As best seen in FIG. 2, a sleeve 53 is fitted into the primary mixture opening 43 to define a primary mixture intake passage or bore to the plenum and separates it from the exhaust chamber 46 and the air chamber 50. The sleeve 53 is, however, provided with two axially spaced apart sets of perforations or openings 54 therein with one set of the openings 54 being aligned with the air chamber 50 while the second set of openings 54 being aligned with the exhaust chamber 46 to permit both the passage of air from air chamber 50 and exhaust gases from chamber 46 into the intake mixture flowing through the intake passage or bore provided by the sleeve 53. In addition, in the construction shown, a second sleeve 55 is fitted into the opening 44 so as to provide a secondary intake passage or bore to the plenum chamber 36, the sleeve 55 being unperforated.

The engine exhaust ports 27 extend laterally from the upper portions of their respective combustion chambers and open downwardly through aligned outlet openings 60 formed in the planar mounting base of the cylinder head - intake manifold member 22 adjacent to the cylinder block 11. The exhaust passages of the inner cylinder pass below one of the longitudinal extending intake distribution passages 40, 42.

An exhaust manifold 61 is secured to the planar mounting face 23 of the cylinder head - intake manifold member and is provided with a plurality of inlet openings 62 registering with the exhaust port outlet openings 60 and connecting with a longitudinal exhaust passage 64. Passage 64 connects at its center with a heat chamber 65 formed below a machined upper wall 66 of the exhaust manifold. Wall 66 extends below and closes the bottom of the intake mixture plenum 36 of the cylinder head - intake manifold member 22, and forms a heated surface for heating the induction mixture delivered to the plenum 36.

A heat valve assembly 68 is mounted on the bottom of the exhaust manifold and includes a vane, not shown, extending within the exhaust passage 64 and which is movable between two positions, in one of which it directs the flow of exhaust gases from the front engine cylinders through the heat chamber 65 and in the other of which it causes the exhaust gases to bypass this chamber. An outlet connection 70 is provided on the exhaust manifold 61 for carrying exhaust gases therefrom to an attached exhaust system, not shown.

Along its upper cylinder head side, the cylinder head - intake manifold member 22 is provided with suitable rails or walls, such as the longitudinal rails or walls 72, 73 which are adapted to sealingly receive a sheet metal valve cover 74 which encloses the engine valve gear, in a conventional manner. In addition, the cylinder head - intake manifold member 22 is provided with suitable means whereby secondary air, as provided for example by an engine driven air pump, not shown, can be injected into the exhaust ports 27 closely adjacent to the exhaust valves 29. In the construction shown, this is provided by means of threaded secondary air inlet openings 75, each of which is positioned to intersect an exhaust port 27 whereby air can be discharged closely adjacent to the exhaust port on the downstream side next adjacent to an exhaust valve 29, with each such opening 75 being adapted to receive an air discharge tube, not shown, of an air injection manifold, also not shown, supplied with secondary air from the above described engine driven air pump.

In operation, an air-fuel mixture is delivered from a carburetor, not shown, mounted on the carburetor mounting pad 45, through the intake sleeves 53 and 55, forming primary and secondary intake bores, respectively, to the mixture plenum 36. Such an air-fuel mixture as it flows through the primary sleeve 53 will be mixed with crankcase fumes and air delivered to the air chamber 50 from the crankcase ventilation system in the manner previously described or with ambient air drawn into the air chamber 50 from the various vacuum actuated elements of the vehicle with which the engine is associated and this mixture is further admixed with recirculated exhaust gases delivered via the exhaust chamber 46. Within the mixing plenum 36, this induction mixture is heated by contact with the heated wall 66 of the exhaust manifold which is maintained at a desired temperature by operation of the heat valve assembly 68. The heated induction mixture then moves to the individual cylinders of the engine through the intake passages and ports previously described.

Although the mixture plenum 36 has its effective bottom wall 66 thereof heated by exhaust gases discharged from the engine and, the walls defining the exhaust chamber 46 are heated by recirculated exhaust gases flowing therethrough, heat transferred from these elements to the carburetor for the engine is reduced or substantially eliminated by the provision of the air chamber 50 which serves as an air gap heat insulator to separate these previously described sources of heat from the carburetor mounted on the pad 45. By having the air chamber in fluid communication through the upper set of passages 54 in the sleeve 53 forming the primary bore and by supplying this air chamber 50 with both air carrying crankcase fumes, and using this chamber as a means by which to provide a vacuum supply for other vacuum actuated elements of the vehicle with which this engine is associated, relatively cool air is constantly flowing through the air chamber and this cooler air can thus effectively air cool the carburetor mounting pad 45.

Although the air gap insulator carburetor mounting arrangement, in accordance with the subject invention, has been described and illustrated as being incorporated into an integral cylinder head and intake manifold structure, it will be readily apparent to those skilled in the art that it can also be incorporated into an intake manifold, per se, for an internal combustion engine.

What is claimed is:

1. An intake manifold means for an internal combustion engine having a cylinder block with a plurality of cylinders therein defining in part the combustion chambers of the engine, a carburetor and, an exhaust manifold, said intake manifold means having an intake mixture receiving plenum positioned to be heated by engine exhaust gases discharged into the exhaust manifold, a mounting pad for the carburetor on the opposite side of said intake manifold means from said mixture receiving plenum and positioned above said mixture receiving plenum, intake passage means in said intake manifold means extending from said mounting pad into communication with said mixture receiving plenum, intake flow passage means in said intake manifold means connecting said mixture receiving plenum and connectable to the combustion chambers of the engine, said intake manifold means having wall means therein defining an exhaust chamber directly above said mixture receiving plenum at least partly surrounding said intake passage means and in communication therewith, said exhaust chamber being connectable to a source of engine exhaust gases for the recirculation of exhaust gases into the mixture receiving plenum via said intake passage means and further defining an air chamber between said exhaust chamber and said mounting pad, said air chamber surrounding said intake passage means and being in fluid flow communication therewith and said air chamber being connectable to a source of induction fluid whereby said mounting pad is air cooled by induction fluid flowing through said air chamber and wherein said air chamber serves as an air gap insulator between said exhaust chamber and said mounting pad.

2. An intake manifold means according to claim 1 wherein said intake passage means includes a primary intake opening extending from said mounting pad to said mixture receiving plenum and a secondary intake opening also extending from said mounting pad to said mixture receiving plenum and, a first sleeve and a second sleeve positioned in said primary intake opening and said secondary intake opening, respectively, said first sleeve having axially spaced apart first and second sets of perforations through the peripheral wall thereof, said first set of perforations being in flow alignment with said air chamber and said second set of perforations being in flow alignment with said exhaust chamber.

3. An intake manifold means according to claim 1 wherein said intake manifold has a first opening therein to said air chamber with an inlet tube positioned therein which is connectable to the positive crankcase ventilation system of the engine and a second opening to said air chamber which is adapted to receive a vacuum hose connection whereby said air chamber can serve as a source for engine vacuum pressure.

4. A cylinder head - intake manifold for an internal combustion engine having a cylinder block with a plurality of longitudinally aligned cylinders opening through a side wall thereof, a carburetor and, an exhaust manifold having a planar mounting surface with a plurality of exhaust openings therein connected by exhaust passage means to a central heat chamber therein with the upper wall of the heat chamber being defined by a part of the mounting surface; said cylinder head - intake manifold having a planar mounting face on one side thereof for sealing engagement with the side wall of the cylinder block to close the ends of the cylinders and to define therewith recessed combustion chambers opening through said mounting face and for sealing engagement with the mounting surface of the exhaust manifold, a mixture receiving plenum in said cylinder head - intake manifold disposed centrally of and laterally adjacent said combustion chambers and having an opening at one end thereof through said mounting face in position to be closed by the upper wall of the heat chamber in the exhaust manifold, a mounting pad for the carburetor on the opposite side of said cylinder head from said mounting face and positioned above said mixture receiving plenum, intake passage means in said cylinder head extending from said mounting pad into communication with said mixture receiving plenum, intake flow passage means in said cylinder head connecting said mixture receiving plenum with said combustion chambers, exhaust passage means in said cylinder head selectively connected at one end to said combustion chambers and selectively terminating at the opposite end in exhaust outlet openings through said mounting face in alignment with corresponding exhaust openings in exhaust manifold and, said cylinder head having wall means therein defining an exhaust chamber directly above said mixture receiving plenum at least partly surrounding said intake passage means and in communication therewith, said exhaust chamber being connectable to a source of engine exhaust gases for the recirculation of exhaust gases into the intake passage means for delivery to said mixture receiving plenum and further defining an air chamber between said exhaust chamber and said mounting pad surrounding said intake passage means and in communication therewith, said air chamber being connectable to a source of air whereby said mounting pad is air cooled by air flowing through said air chamber into said intake passage means.

5. A cylinder head - intake manifold according to claim 4 wherein said intake passage means includes a primary intake opening extending from said mounting pad to said mixture receiving plenum and a secondary intake opening also extending from said mounting pad to said mixture receiving plenum and, a first sleeve and a second sleeve positioned in said primary intake opening and said secondary intake opening, respectively, said first sleeve having axially spaced apart first and second sets of openings through the peripheral wall thereof, said first set of perforations being in flow alignment with said air chamber and said second set of perforations being inflow alignment with said exhaust chamber.

6. A cylinder head - intake manifold according to claim 4 wherein said cylinder head - intake manifold has a first opening therein to said air chamber which is connectable to a crankcase ventilation system for the engine and a second opening to said air chamber which is adapted to receive a vacuum hose connection whereby said air chamber can serve as a source of engine vacuum pressure for any vacuum actuated elements normally associated with the engine.

* * * * *